No. 851,700. PATENTED APR. 30, 1907.
D. W. SMITH.
CORN SHOCKING MACHINE.
APPLICATION FILED JULY 26, 1906.
2 SHEETS—SHEET 1.
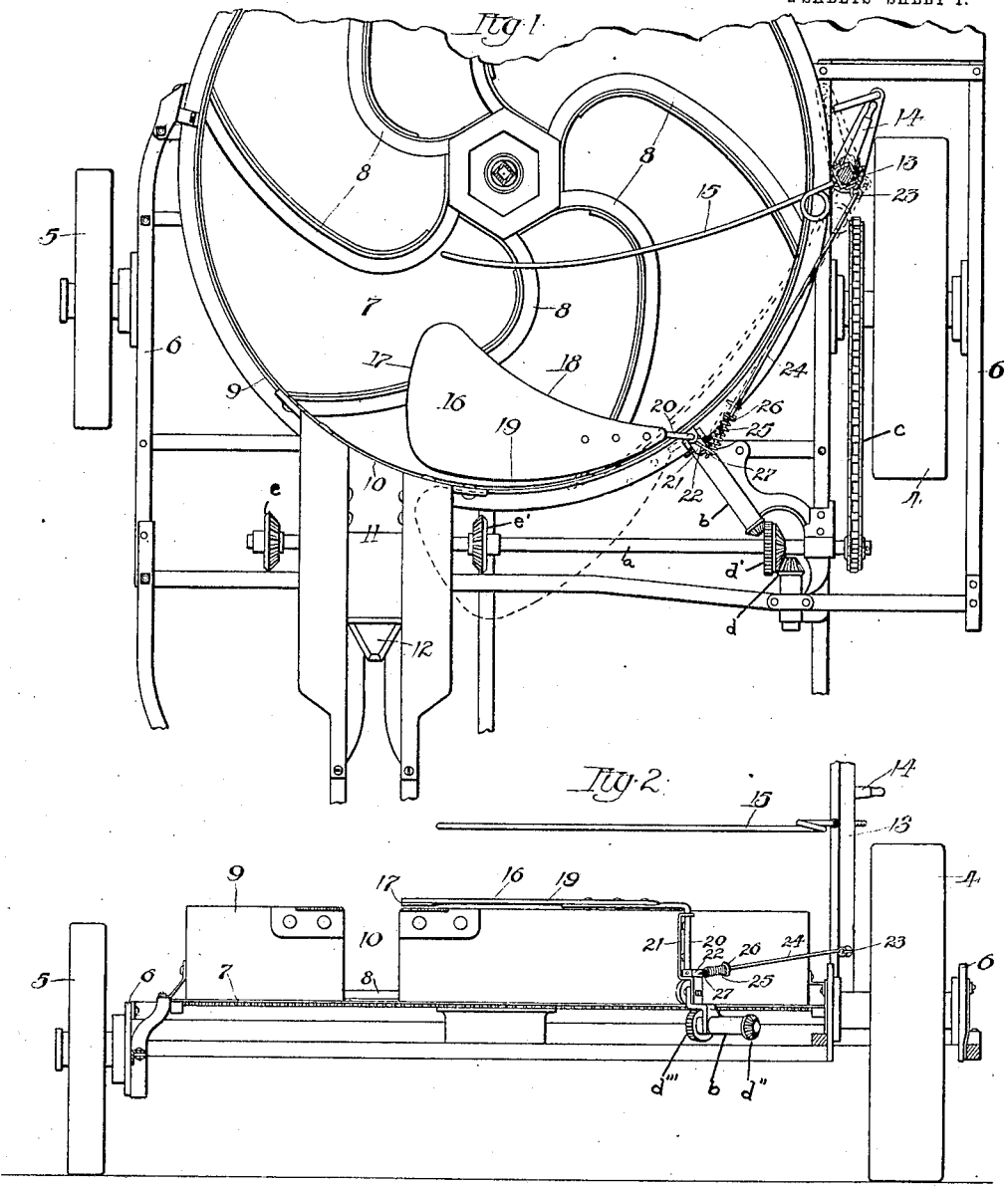
Witnesses:
F. W. Hoffmeister
J. M. Daggett
Inventor
Daniel W. Smith
By E. W. Burgess
Attorney No. 851,700. PATENTED APR. 30, 1907.
D. W. SMITH.
CORN SHOCKING MACHINE.
APPLICATION FILED JULY 26, 1906.
2 SHEETS—SHEET 2.
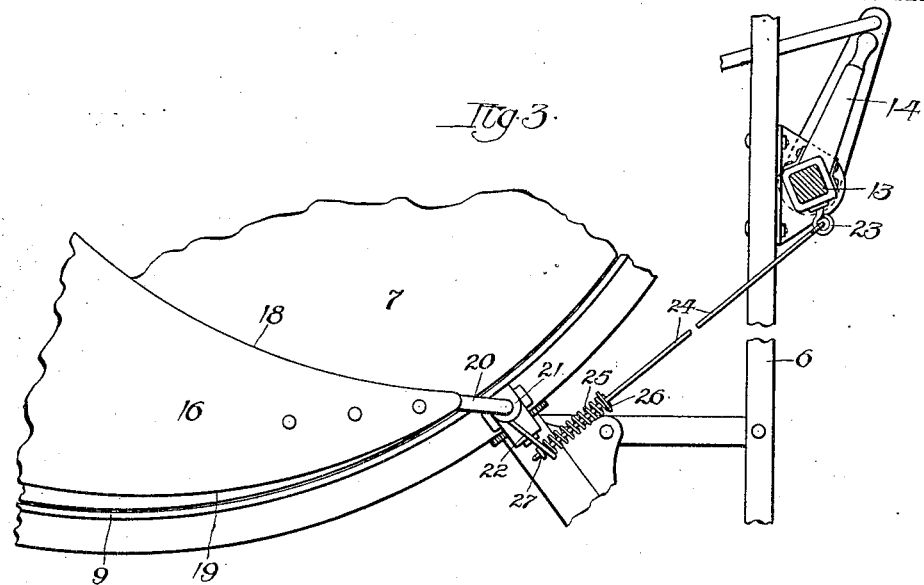
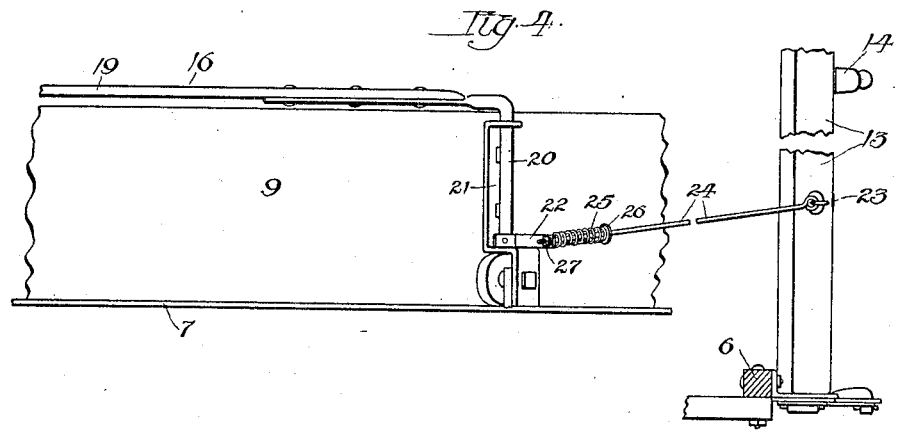
Witnesses:
F. W. Hoffmeister.
F. N. Daggett.
Inventor:
Daniel W. Smith.
By E. W. Burgess
Attorney
THE NORRIS PETERS CO., WASHINGTON, D. C.

UNITED STATES PATENT OFFICE.

DANIEL W. SMITH, OF CHICAGO, ILLINOIS, ASSIGNOR TO INTERNATIONAL HARVESTER COMPANY, A CORPORATION OF NEW JERSEY.

CORN-SHOCKING MACHINE.

No. 851,700.      Specification of Letters Patent.      Patented April 30, 1907.

Application filed July 26, 1906. Serial No. 327,824.

*To all whom it may concern:*

Be it known that I, DANIEL W. SMITH, a citizen of the United States, residing at Chicago, in the county of Cook and State of Illinois, have invented certain new and useful Improvements in Corn-Shocking Machines, of which the following is a specification, reference being had to the accompanying drawings, forming a part thereof.

My invention relates to corn shocking machines in general, and specifically to devices for forming the shock in combination with a constantly rotating table and a shock-forming standard mounted thereon.

The corn is conveyed in an upright position through a passageway in rear of the cutting mechanism, with the butts resting upon the bottom of the passageway, in which position it is delivered to the rotating table and shock-former.

In the operation of machines of the above mentioned type it has been found that the butts of the stalks would often be improperly delivered to the shock-former, owing to their moving laterally after leaving the passageway against the action of the rotating table, and become twisted and crooked.

The object of my invention is to remedy the above defective operation by providing a yielding guide having a portion forming a continuation of one side of the passageway and overhanging the rotating platform upon the side of the passageway opposite to the direction of motion of the rotating platform, the guide being yieldingly held against the butts of the stalks during the shock forming operation.

Referring to the drawings—Figure 1 represents a plan view of so much of a corn shocking machine as is thought to be sufficient to illustrate the application of my invention. Fig. 2 is a front end elevation of Fig. 1. Fig. 3 is a detached detail of portions of the device drawn upon a larger scale; and Fig. 4 is a side elevation of Fig. 3.

Similar numerals represent like parts throughout the several views.

4 indicates the main drive wheel, 5 the grain wheel, 6 the wheel frame, 7 the rotatable platform, provided at its center with means for supporting a shock-former, the platform deriving motion from the drivewheel by means of a cross-shaft $a$, diagonal shaft $b$ chain $c$ and gears $d$, $d'$, $d''$ and $d'''$, and $e$ and $e'$ are gears for transmitting motion to the gathering and stalk forwarding mechanism, not shown, 8 curved arms secured to the platform and operative to advance the butts of the stalks in the direction of rotation of the platform, 9 a fixed retaining wall surrounding the platform and having a gap 10 coincident with the delivery end of a passageway 11 extending forward to a cutting mechanism 12.

13 represents a rocking, vertically arranged standard, having a sweep lever 14 secured thereto, by means of which it may be rotated, and 15 indicates curved, spring, stalk retaining arms secured to said standard and yieldingly held in a position overhanging the platform and partially encircling the shock-former.

16 is a guide for the butts of the stalks, the portion 17 being substantially a continuation of the stubbleward side of the passageway 11, and the inner curved portion 18, and outer edge 19 being shaped to substantially conform with the periphery of the platform when the guide is at the limit of its movement in opposite directions. The guide is mounted upon a vertical rod 20, having bearings in a bracket 21 secured to the retaining wall. An arm 22 is secured to the vertical rod, and an eye bolt 23 is secured to the standard 13; a link 24 connects the eyebolt with the arm and is slidably mounted in the latter; a coiled spring 25 encircles the link adjacent the arm and is operative between the arm and a collar 26, passing through the link, to yieldingly hold the guide toward the center of the rotatable platform, and a nut 27 at the end of the link is operative to adjust the tension of the spring.

When the standard 13 is rocked in a direction to release the spring arms from contact with the shock to butts guide is swung about its axis as shown by dotted lines in Fig. 1, in which position it is out of the way of the shock-former when the latter is swung to place after the shock is deposited upon the ground. As the shock is being formed the butts of the stalks are crowded against the inner edge of the guide, and it yields against the action of the spring in a manner to more successfully control the butts of the stalks, resulting in a more perfectly formed shock.

What I claim as my invention, and desire to secure by Letters Patent, is:

1. A corn shocking machine comprising, in combination, a cutting mechanism, a passageway in rear of said cutting mechanism, a rotatable platform at the delivery end of said passageway, a vertically arranged standard pivotally mounted upon a fixed part of the machine, a yielding stalk-guide adapted to overhang said platform and pivotally mounted on a fixed part of the machine, and a link having eccentric connections with said standard and said guide.

2. A corn shocking machine comprising, in combination, a cutting mechanism, a passageway in rear of said cutting mechanism, a rotatable platform at the delivery end of said passageway, a stationary wall surrounding said platform and having an opening therein coinciding with the delivery end of said passageway, a yielding stalk-guide having at one end a vertically arranged shaft secured thereto, said shaft being journaled in bearings secured to said stationary wall, said guide overhanging said platform and having a portion thereof substantially in line with that side of said passageway opposite the direction of rotation of said platform, a vertically arranged standard pivotally mounted on a fixed part of the machine, an arm secured to said vertically arranged shaft, and a yielding link connected eccentrically with said standard and with said arm secured to said vertically arranged shaft.

DANIEL W. SMITH.

Witnesses:
WM. N. SCHNEIDER,
A. L. KLINE.